ABSTRACT OF THE DISCLOSURE

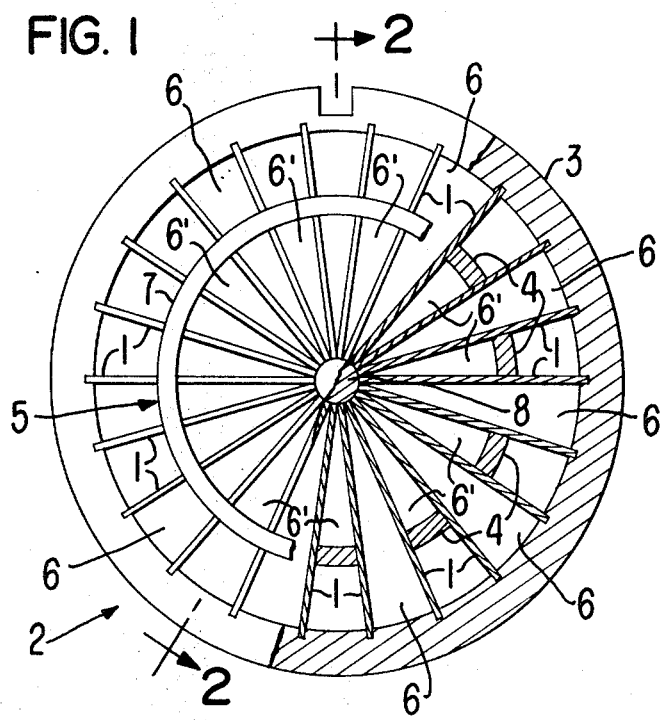
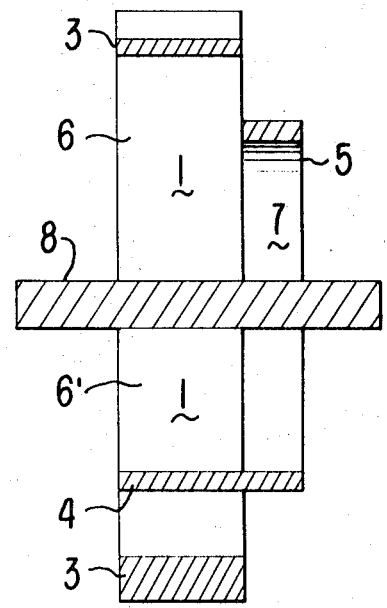
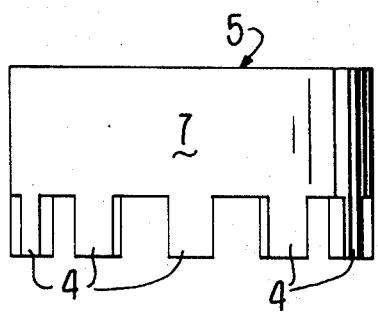
FIG. 1
FIG. 2
FIG. 3
FIG. 4
(a) GRIND VANES & INSERT INTO SLOTTED OUTER RING → (b) INTER-DIGITATE LEGS OF SPIDER INTO VANE SPACES → (c) INSERT CENTER POST → (d) BRAZE → (e) GRIND OFF RING OF SPIDER → (f) EDM MACHINE OUT CENTER POST
INVENTORS
LEONARD SAFRAN
JOHN B. HORRIGAN
BY Gerald L Moore
ATTORNEY 3,608,167
METHOD FOR FABRICATING A "RISING SUN" MAGNETRON ANODE
Leonard Safran and John B. Horrigan, Beverly, Mass., assignors to Varian Associates, Palo Alto, Calif.
Filed Nov. 12, 1969, Ser. No. 875,656
Int. Cl. H01j 9/00
U.S. Cl. 29—25.14                                    6 Claims

A method for fabricating a molybednum "rising sun" magnetron anode is disclosed. In the method, the radial array of vanes is brazed intermediate an outer ring and an inner post. A spider structure having a ring shaped body with dependent axially directed leg portions is brazed to the vanes with the leg portions being located in every other space between adjacent vanes to form a rigid self jigging structure. Once brazed, the center post, adjacent vane tips and ring portion of the spider are removed to define a "rising sun" anode configuration.

DESCRIPTION OF THE PRIOR ART

Heretofore, attempts have been made to fabricate molybdenum "rising sun" magnetron anodes of small size, i.e., 0.5" dia. with 22 vanes, and precise tolerance, ±0.0005", by conventional techniques including brazing in jig structures, and electrical discharge machining. However, the resultant anodes failed to have the requisite high degree of dimensional symmetry and/or failed to have a sufficiently low effective temperature coefficient, i.e., frequency versus temperature characteristic.

SUMMARY OF THE PRESENT INVENTION

The principal object of the present invention is the provision of an improved method for fabricating "rising sun" magnetron anode structures.

One feature of the present invention includes the steps of inserting a spider shaped ring structure having dependent axially directed legs into a circular array of vanes such that a leg is positioned in every other sector-shaped space between adjacent vane members, brazing the spider ring in place, and removing the ring shaped body portion of the spider such that the remaining leg portions define the outer end walls for the short cavities of the "rising sun" geometry.

Another feature of the present invention is the same as the preceding feature including the steps of, brazing a center post structure to the inner vane tips and a surrounding ring structure to the outer peripheral edges of the vanes, and removing the center post structure by electrical discharge machining to define the characteristic "rising sun" anode geometry.

Another feature of the present invention is the same as any one or more of the preceding features wherein the vanes, spider and outer ring structures are all made of molybdenum.

Another feature of the present invention is the same as any one or more of the preceding features wherein the parts are brazed together with platinum.

Other features and advantages of the present invention will become apparent upon a perusal of the following specification taken in connection with the accompanying drawings wherein:

BRIEF DESCRIPTION OF THE DRAWINGS

FIG. 1 is plan view, partly in sections, of a "rising sun" magnetron anode assembly incorporating features of the present invention.

FIG. 2 is a sectional view of the structure of FIG. 1 taken along line 2—2 in the direction of the arrows.

FIG. 3 is an elevational view of the ring-shaped spider structure used in the assembly of FIGS. 1 and 2, and FIG. 4 is a flow diagram in block diagram form depicting the method for fabricating "rising sun" magnetron anode structures according to the present invention.

DESCRIPTION OF THE PREFERRED EMBODIMENTS

Referring now to FIGS. 1–4, the method for fabricating "rising sun" magnetron anodes according to the present invention will be described. In step (a), the vanes 1 (see FIGS. 1, 2 and 4) of the magnetron anode circuit 2 are ground to size, such as thickness 0.0079", length 0.2340" and height 0.130". The vanes 1 are preferably made of molybdenum to provide high thermal capacity and low temperature coefficient for the resultant circuit. The ground vanes 1 are then inserted into an anode ring 3, as of molybdenum, which surrounds the vanes 1 and which includes an array of axially directed slots in its inside wall to receive the outer ends of the vanes 1. In a typical example, there are 22 vanes and 22 slots with the slots being $$0.0090 \genfrac{}{}{0pt}{}{+0.0000''}{-0.0005''}$$

wide.

In step (b), the axially directed leg portions 4 of a ring-shaped spider 5 (see FIG. 3), as of molybdenum, are inserted axially into every other sector-shaped space 6 defined between adjacent vane members 1 (see FIGS. 1 and 2). A ring-shaped body portion 7 of the spider 5 abuts one side edge of the vanes 1. In a typical example, the spider 5 has an inside diameter of 0.3300" a wall thickness of 0.0200", a leg length of 0.130", an overall axial length of 0.187", and the legs 4 have a circumferential width of 0.0445".

In step (c), a cylindrical center post 8 is axially inserted in the central space at the inner vane tips such that the vane tips abut the post 8. In a typical example, the center post 8 is a 0.375" length of 0.0550" diameter molybdenum rod. At this point the anode assembly is self jigging and platinum brazing alloy is placed in position adjacent the joints to be formed between the post 8, vanes 1, spider 5 and outer ring 3.

In step (d), the anode subassembly is brazed at the melting point of platinum to produce a rigid structure. Platinum is used as the brazing alloy because it has a relatively low coefficient of linear thermal expansion, namely, $10.2 \times 10^{-6}$, which is close to that of molybdenum, namely, $4.9 \times 10^{-6}$.

In step (e), the ring-shaped body portion 7 of the spider 5 is ground off to leave just the leg portions 4 in every other anode sector-shaped cavity 6, thereby defining the outer end walls for the short cavities 6' in the "rising sun" magnetron anode configuration. In step (f), the center post 8 and portions of the adjacent tips of vanes 1 are electrically discharge machined out to leave the vane cavities open at the inner vane tips. In a typical example, the diameter of the inner bore is 0.123".

The advantage of fabricating the "rising sun" anode according to the aforedescribed method is that extremely high dimensional symmetry is thereby obtained in the resultant anode structure. By use of the platinum brazing material an overall temperature coefficient is obtained which is substantially that of pure molybdenum.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

We claim:

1. In a method for fabricating a "rising sun" magnetron anode structure the steps of, assembling circular array of radially directed anode vane members into a surrounding ring structure, assembling a center post structure at the inner radial ends of the array of vane members, assembling a spider structure having a ring-shaped body with an array of dependent longitudinally directed circumferentially spaced leg portions into the array of vane members such that the leg portions of the spider structure are interdigitated into every other space between adjacent vane members, brazing the assembled part together to produce a rigid assembly, removing the ring-shaped body portion of the spider member to leave the leg portion in every other space between adjacent vane member to define a "rising sun" anode cavity configuration, and removing the center post structure.

2. The method of claim 1 wherein the step of removing the center post structure includes the step of electrically discharge machining out the center post structure and adjacent portions of the inner tips of the wave members.

3. The method of claim 1 wherein the step of removing the ring-shaped body portion of the spider includes the step of grinding off the ring-shaped body of the spider.

4. The method of claim 1 wherein the outer surrounding ring structure vane members, and spider are all made of molybdenum.

5. The method of claim 4 wherein the step of brazing includes brazing with platinum as the brazing material.

6. The method of claim 1 wherein the step of assembling the vane members into the surrounding ring structure includes, locating the outer edges of the vane members in an array of longitudinally directed circumferentially spaced slots in the inside wall of the surrounding ring structure.

References Cited

UNITED STATES PATENTS

| 2,473,399 | 6/1949 | Spencer | 315—390.65X |
| 2,520,955 | 9/1950 | Okress et al. | 29—25.14X |
| 2,896,307 | 7/1959 | Whiteley | 29—25.14 |
| 2,921,363 | 1/1960 | Nielsen | 29—25.14 |
| 3,058,029 | 10/1962 | Clampitt et al. | 29—25.14X |
| 3,136,027 | 6/1964 | Beltz et al. | 29—25.14 |
| 3,293,487 | 12/1966 | Pickering | 29—25.14X |
| 3,374,537 | 3/1968 | Doelp, Jr. | 29—471.1X |
| 3,419,951 | 1/1969 | Carlson | 29—481X |

JOHN F. CAMPBELL, Primary Examiner

R. B. LAZARUS, Assistant Examiner

U.S. Cl. X.R.

29—25.17, 471.3, 472.1; 315—39.65